(12) United States Patent
Kurz et al.

(10) Patent No.: US 10,393,450 B2
(45) Date of Patent: Aug. 27, 2019

(54) COLLECTOR PLATE FOR A HEAT EXCHANGER MANIFOLD

(75) Inventors: Volker Kurz, Stuttgart (DE); Hicham Rouhana, Korntal-Münchingen (DE); Haymo Bröder, Leonberg (DE)

(73) Assignee: MAHLE INTERNATIONAL GMBH, Stuttgart (DE)

( * ) Notice: Subject to any disclaimer, the term of this patent is extended or adjusted under 35 U.S.C. 154(b) by 728 days.

(21) Appl. No.: 14/118,934

(22) PCT Filed: May 16, 2012

(86) PCT No.: PCT/EP2012/059212
§ 371 (c)(1),
(2), (4) Date: Feb. 27, 2014

(87) PCT Pub. No.: WO2012/159971
PCT Pub. Date: Nov. 29, 2012

(65) Prior Publication Data
US 2014/0174702 A1    Jun. 26, 2014

(30) Foreign Application Priority Data

May 20, 2011    (DE) .................. 10 2011 076 225

(51) Int. Cl.
*F28F 9/02* (2006.01)
*F28F 1/10* (2006.01)
(Continued)

(52) U.S. Cl.
CPC ................ *F28F 1/10* (2013.01); *B21D 53/02* (2013.01); *B23P 15/26* (2013.01); *F28F 9/0224* (2013.01);
(Continued)

(58) Field of Classification Search
CPC ....... F28D 1/053; F28F 9/0226; F28F 9/0224; F28F 9/16; F28F 2265/26; F28F 9/0236;
(Continued)

(56) References Cited

U.S. PATENT DOCUMENTS 6,082,439 A * 7/2000 Kato ..................... F28F 9/0226
165/173
7,600,560 B2    10/2009 Heuss et al.
(Continued)

FOREIGN PATENT DOCUMENTS

DE    10 2004 040 988 A1    3/2005
DE    10 2005 058 177 A1    6/2006
(Continued)

OTHER PUBLICATIONS

International Search Report, PCT/EP2012/059212, dated Sep. 27, 2012, 3 pgs.
(Continued)

*Primary Examiner* — Jason N Thompson
(74) *Attorney, Agent, or Firm* — Paul D. Strain, Esq.; Strain & Strain PLLC

(57) ABSTRACT

A heat exchanger of a type with a collector plate which has a wall in which are formed rim holes which can receive the ends of tubes of a bundle, wherein the wall of the collector plate is designed such that, for the purpose of a soldered or welded connection to the tubes, it forms collars around the rim holes, and wherein the wall has a front side facing toward the tube bundle and a rear side facing toward the collecting tank. Each collar extends in the direction of the collecting tank from a straight base plane on the rear side of the wall.

7 Claims, 3 Drawing Sheets

(51) Int. Cl.
*B21D 53/02* (2006.01)
*B23P 15/26* (2006.01)
*F28D 1/053* (2006.01)

(52) U.S. Cl.
CPC ....... *F28D 1/05366* (2013.01); *Y10T 29/4935* (2015.01)

(58) Field of Classification Search
CPC .......... F28F 9/0241; F28F 1/10; B21D 53/02; B23P 15/26
USPC .................................................. 165/173, 158
See application file for complete search history.

(56) References Cited

U.S. PATENT DOCUMENTS

| | | | |
|---|---|---|---|
| 9,089,890 B2 | 7/2015 | Auchter et al. | |
| 2005/0133208 A1* | 6/2005 | Powers | F28F 9/0226 165/149 |
| 2006/0151158 A1* | 7/2006 | Ozaki | F28D 1/05366 165/173 |
| 2007/0186575 A1* | 8/2007 | Heuss | F28D 1/05383 62/305 |
| 2008/0000626 A1* | 1/2008 | Sugito | F28D 1/05366 165/173 |
| 2009/0255657 A1 | 10/2009 | Hakamata et al. | |

FOREIGN PATENT DOCUMENTS

| | | | |
|---|---|---|---|
| DE | 10 2007 016 528 A1 | 11/2007 | |
| DE | 10 2008 033 594 A1 | 2/2009 | |
| DE | 102008033594 * | 2/2009 | ............... F28F 9/02 |
| DE | 10 2008 051 422 A1 | 4/2010 | |
| EP | 0 577 239 B1 | 6/1996 | |
| EP | 1 462 753 A2 | 9/2004 | |
| EP | 1 972 879 A2 | 9/2008 | |
| FR | 2 270 471 A1 | 12/1975 | |
| JP | S57-158224 | 10/1982 | |
| JP | 59-65289 U | 5/1984 | |
| JP | 11051592 A | 2/1999 | |
| JP | 2003-094135 A | 4/2003 | |
| JP | 2004-293982 A | 10/2004 | |
| JP | 2007-526431 A | 9/2007 | |
| JP | 2008-522131 A | 6/2008 | |
| JP | 2008-224057 A | 9/2008 | |
| JP | 2008-261550 | 10/2008 | |
| SU | 1190978 A3 | 11/1985 | |
| WO | WO 2005/085738 A1 | 9/2005 | |
| WO | WO 2008/071362 A1 | 6/2008 | |
| WO | WO 2008071362 A1 * | 6/2008 | ............ F28F 9/0224 |
| WO | WO 2009/149838 A1 | 12/2009 | |

OTHER PUBLICATIONS

German Search Report, DE 10 2011 076 225.6, dated Oct. 5, 2011, 8 pgs.

* cited by examiner

COLLECTOR PLATE FOR A HEAT EXCHANGER MANIFOLD

CROSS-REFERENCE TO RELATED PATENT APPLICATIONS

This application is a National Stage of International Application No. PCT/EP2012/059212, filed May 16, 2012, which is based upon and claims the benefit of priority from prior German Patent Application No. 10 2011 076 225.6, filed May 20, 2011, the entire contents of all of which are incorporated herein by reference in their entirety.

The invention relates to a heat exchanger according to the preamble of claim 1, and also to a method for producing a heat exchanger, especially a collector plate for a heat exchanger according to the preamble of claims 6 and 7.

The purpose of a heat exchanger is the exchange of heat between two media. The medium which is to be heated or cooled can have a liquid or gaseous state of aggregation or experience a change of state of aggregation when a flow passes through the heat exchanger. A heat exchanger for the most part comprises a tube/corrugated rib matrix and also collecting vessels with collector plates, which accommodate the tubes. For the tube/corrugated rib matrix an extruded or welded or folded round tube or flat tube can be used. The collecting vessels are often formed from two separate parts (half-shells or box sections) and have supports for accommodating the connecting pipes. The lower half-shell has passages which accommodate the tubes through which flow passes.

A generic-type heat exchanger is disclosed in WO 2009149838 A1, for example. This heat exchanger, especially a heat exchanger for a motor vehicle, comprises a multiplicity of tubes, at least one header with a wall and openings in the wall, and passages which are formed at said openings, projecting from the wall in the axial direction of the openings. The tubes are arranged partially in the passages in the region of one end of said tubes so that a fluid tight connection exists between the passages and the tubes.

A generic-type header for heat exchangers is also disclosed in DE 10 2004 040 988 A1. The header comprises inter alia a flat base region and a pair of stepped regions which by a rectilinear or curved contour are angled in relation to the plane of the base region. The header is designed with a multiplicity of parallel, spaced apart slots over its length. Each slot is designed with an elongated section which extends over the width of the base region, and end sections which project from the elongated section in the stepped region of the header.

The bottom passage or the tube opening into which the tube ends are inserted are split or perforated in the case of the prior art. The passage itself offers a relatively small number of locating and support surfaces, especially on the tube narrow sides. On account of the manufacturing processes or the construction, the tube narrow side is the point which is subjected to the highest thermal load when the passage is being soldered or welded to the tube ends. In this respect, as thermal stress increases, the stress in the region of the connecting point of the tube bottom connection, and particularly the tube narrow side, increases considerably. A frequent premature fracture or a crack at the relevant connecting point results from this.

The invention is based on the object of creating an improved heat exchanger especially with regard to thermal stress.

This object is achieved by means of a heat exchanger with the features of claim 1. Advantageous embodiments are the subject of the dependent claims.

The object is achieved according to the invention by a collar extending in each case from a rectilinear base plane on the rear side of the wall in the direction of the collecting vessel. The collars, therefore, are not arranged as known from the prior art from the front side in the direction of the tube bundles, but rather on the rear side of the collector plate, and therefore extend from the wall in the direction of the collecting vessel. As a result of the design and arrangement according to the invention of the collars, the tube narrow sides in particular can be unloaded by the effect of the stress peaks and the expansion force, which arises as a result of the heating up of the tubes, being deflected.

The solution according to the invention can be used for all types of heat exchangers, especially in vehicle construction, particularly for heat exchangers with soldered and/or welded collecting vessels but also for heat exchangers with a collecting vessel made of plastic.

One embodiment provides that each collar, in the contact region of the tube narrow side, defines an end region on the rear side of the wall which extends or is raised obliquely upwards and outwards from the base plane.

As a result of the obliquely upwards and outwards extending or raised end region on the rear side of the wall, a simultaneous recess of the end region is created in relation to the otherwise essentially rectilinear front side. This recess can serve as an additional filling surface during a soldering or welding process and in this respect is located especially advantageously around the tube narrow side.

A further embodiment provides that by introducing the passages in the contact region for the tubes, a passage contact surface is formed, wherein the passage contact surface can be of an at least slightly curved design.

A further preferred embodiment provides that by, introducing the passages in the contact region for the tubes, a passage contact surface is formed, wherein the passage contact surface can be of trapezoidal design.

The invention also relates to a method according to the invention for producing heat exchangers, especially a collector plate, with the steps of forming or introducing a trough-like recess in the collector plate in the direction of the tube bundle, subsequent reverse forming of at least one section of the recess in the direction of the collecting vessel, and finally forming or introducing the passages in the direction of the collecting vessel. It is also conceivable to interchange the second and third method steps so that it is possible for the forming or introducing of the passages in the direction of the collecting vessel to have already been carried out in the second method step and then for the reverse forming of at least one section of the recess in the direction of the collecting vessel to be carried out in the third method step.

It is essential for the invention that the collar always extends on the rear side of the collector plate or wall, or always extends from a rectilinear reference plane on the rear side in the direction of the collecting vessel.

In an additional variant, it is provided that in the second method step (claim 6) or in the third method step (claim 7) only the plane between the passages in the direction of the collecting vessel is reverse formed.

In an additional variant, by the reverse forming of at least one section of the trough-like recess, the rectilinearly extending base plane can be formed. This section is especially the material section which extends between two adjacent passages.

Further advantages, features and details of the invention are gathered from the subsequent description in which an exemplary embodiment of the invention is described with reference to the drawings. In this case, the features which are mentioned in the claims and in the description may be essential for the invention separately in each case or in any combination.

Figure 1:
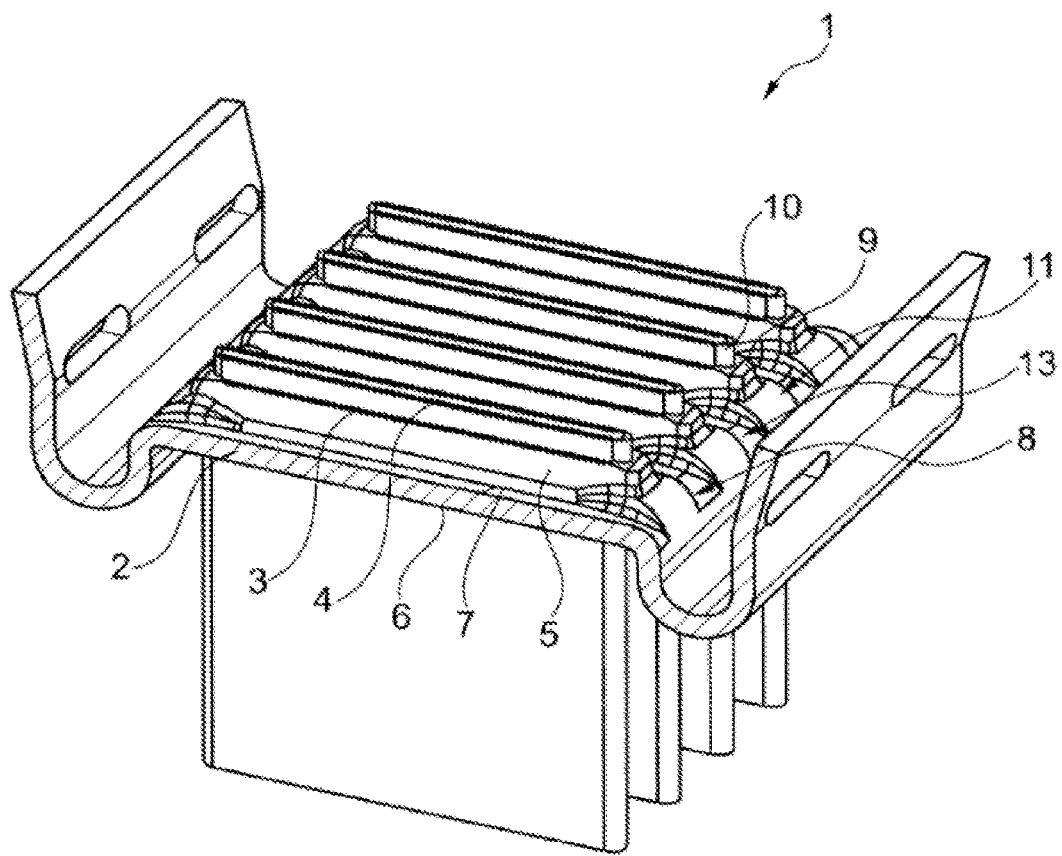
FIG. 1 shows a schematically represented section of a collector plate with integrated tube ends.

FIG. 1 shows in a schematic representation a section of a collector plate 1 which is shown in a shortened form. The collector plate 1 has a wall 2 into which passages 3 (like components have the same designations) are introduced, which passages accommodate the ends of tubes 4 of a bundle. The wall 2 of the collector plate 1 is designed so that it forms collars 5 around the passages 3 for the purpose of a soldered or welded connection to the tubes 4, wherein the wall 2 has a front side 6 which faces the tube bundle and rear side 7 which faces the collecting vessel, which is not shown in more detail.

In this case, a collar 5 extends in each case from a rectilinear base plane 8 on the rear side 7 of the wall 2 in the direction of the collecting vessel. Each collar 5, in the contact region 9 of the tube narrow side 10, defines an end region 11 on the rear side 7 of the wall 2, which extends or is raised obliquely upwards and outwards from the base plane 8. The raised end region 11 is created by only the intermediate regions 13 of adjacent passages 3 being reverse formed.

Figure 2:
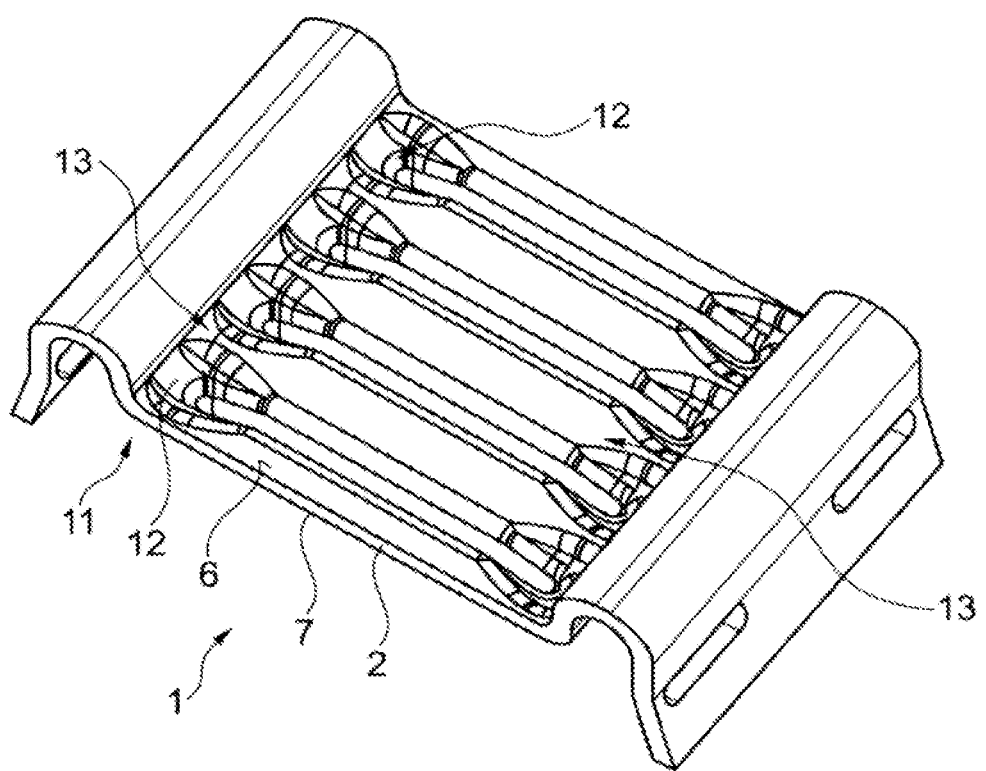
FIG. 2 shows the collector plate according to FIG. 1 in a rear view.

FIG. 2 shows the collector plate 1 in a rear view. It is easy to see that as a result of the obliquely upwards and outwards extending or raised end region 11 on the rear side 7 of the wall 2, a simultaneous recess 12 of the end region in relation to the otherwise essentially rectilinear front side 6, is created.

The recess 12 is created by only the intermediate regions 13 of adjacent passages 3 being reverse formed.

Figure 3:
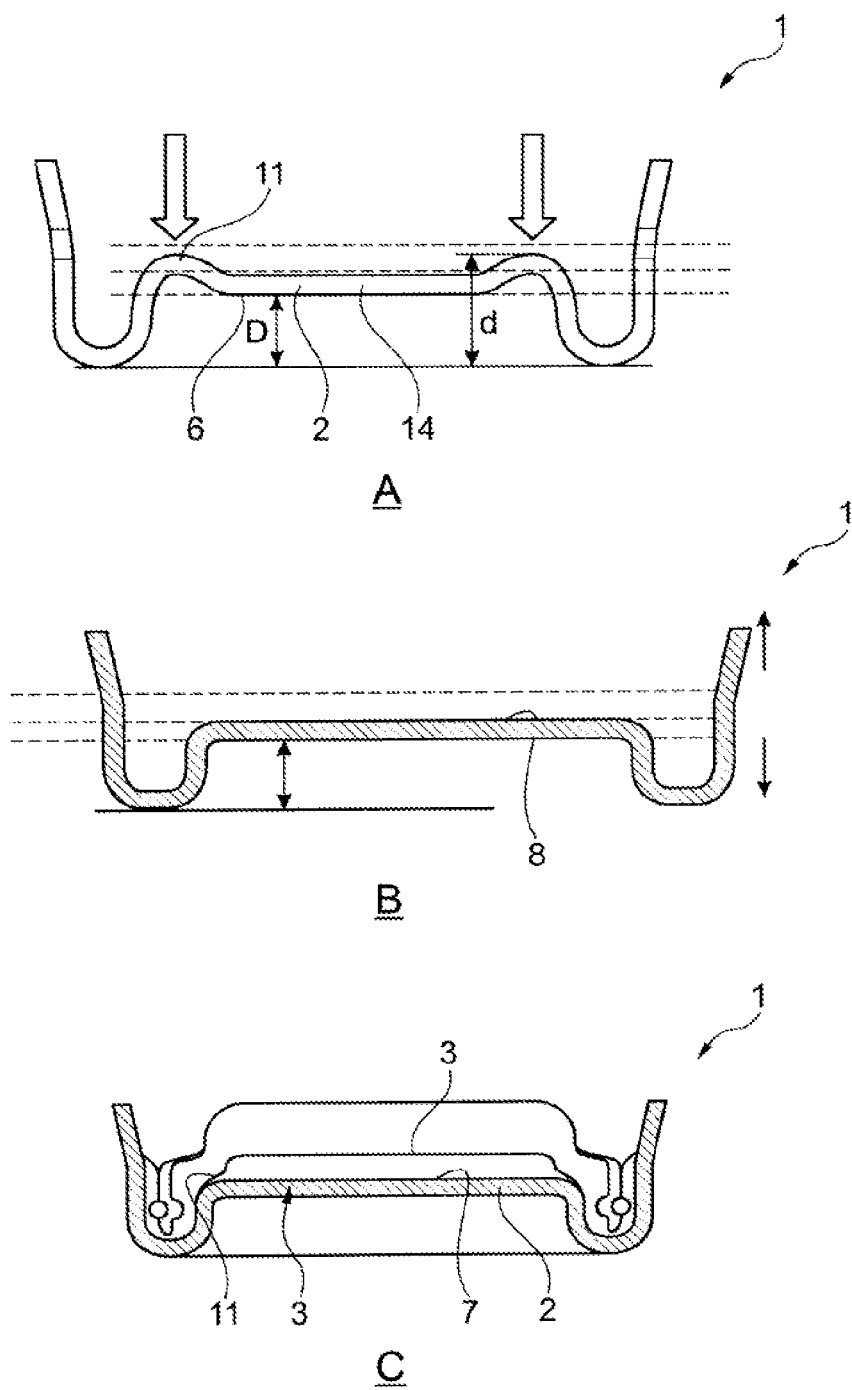
FIG. 3 shows schematically represented method steps A to C for producing a collector plate according to FIG. 1.

FIG. 3 shows the schematically represented method steps A to C for producing a collector plate 1 with passages 3.

The method step A comprises in this case at least the forming or introducing of a trough-like recess 14 in the collector plate 1 in the direction of the tube bundle, at the same time forming the raised end regions 11. The recess 14 is located on the front side 6 of the wall 2. In this case, D can be equal to 5 mm and d can be equal to 8 mm, for example.

In a second method step B, the rectilinear base plane 8 which extends between two passages 3 is formed by reverse forming in a specific area of the recess 14. In the region of the end regions 11 which remain raised, the passages 3 are then formed in the method step C, as a result of which the collars 3, which extend from the base plane 8, are created on the rear side 7 of the wall 2.

The invention claimed is:

1. A heat exchanger having a collector plate, wherein the collector plate comprises a wall having a plurality of passages, wherein each passage is configured to accommodate a tube end of one tube of a tube bundle, wherein a collar formed by the wall is arranged around each passage, wherein the collar is soldered or welded to the tube end, wherein the wall comprises a front side which faces the tube bundle and a rear side which faces a collecting vessel, wherein the collar comprises a long side and a short side, wherein the long side of the collar extends from a rectilinear base plane formed on the rear side of the wall towards the collecting vessel, wherein each tube in the tube bundle is a flat tube having a wide side and a narrow side, wherein a contact region of the tube is formed where the collar abuts the tube end, wherein a portion of the collar abutting the contact region of the tube on the narrow side of the tube is arranged between the tube and an end region, wherein the end region projects vertically obliquely upwards and outwards from the base plane on the rear side of the wall towards a collar end and intersects with the portion of the collar abutting the contact region on the narrow side of the tube such that a curved profile of the end region is defined between the base plane and the collar, wherein two parallel edges of the end region are defined by two parallel planar side walls which are orthogonal to the base plane, wherein the end region has a curved side between the two parallel edges, wherein the short side of the collar extends from the end region towards the collecting vessel, wherein said end region thereby also forms a simultaneous recess on the front side of the wall, wherein the base plane extends across an entire length of the tube end.

2. The heat exchanger as claimed in claim 1, wherein a passage contact surface is formed at a portion of each passage abutting the contact region of the tube, wherein the passage contact surface is of an at least slightly curved design.

3. The heat exchanger as claimed in claim 1, wherein, a passage contact surface is formed at a portion of each passage abutting the contact region of the tube, wherein the passage contact surface is of trapezoidal design.

4. A method for producing a heat exchanger, especially a collector plate, as claimed in claim 1, with the steps:

forming or introducing a trough-like recess in the collector plate in the direction of the tube bundle and subsequent reverse forming of at least one section (intermediate region) of the recess in the direction of the collecting vessel forming or introducing the passages in the direction of the collecting vessel.

5. The method as claimed in claim 4, wherein in the second method step only the plane (intermediate region) between the passages in the direction of the collecting vessel is reverse formed.

6. The method as claimed in claim 4, wherein as a result of the reverse forming of at least one intermediate region of the trough-like recess the rectilinearly extending base plane is formed.

7. A heat exchanger having a collector plate, wherein the collector plate comprises a wall having a plurality of passages, wherein each passage is configured to accommodate a tube end of one tube of a tube bundle, wherein a collar formed by the wall is arranged around each passage, wherein the collar is soldered or welded to the tube end, wherein the wall comprises a front side which faces the tube bundle and a rear side which faces a collecting vessel, wherein the collar comprises a long side and a short side, wherein the long side of the collar extends from a rectilinear base plane formed on the rear side of the wall towards the collecting vessel, wherein each tube in the tube bundle is a flat tube having a wide side and a narrow side, wherein a contact region of the tube is formed where the collar abuts the tube end, wherein a portion of the collar abutting the contact region of the tube on the narrow side of the tube is arranged between the tube and an end region, wherein the end region projects vertically obliquely upwards and outwards from the base plane on the rear side of the wall towards a collar end and intersects with the portion of the collar abutting the contact region on the narrow side of the tube such that a curved profile of the end region is defined between the base plane and the collar, wherein two parallel edges of the end region are defined by two parallel planar side walls which are orthogonal to the base plane, wherein the end region has a curved side between the two parallel edges, wherein the short side of the collar extends from the end region towards the collecting vessel, wherein said end region thereby also forms a simultaneous recess on the front side of the wall, wherein the base plane extends across an entire length of the end region on two sides of the end region and is arranged below the end region, wherein a recess is formed in the front side of the wall that is opposite of and complimentary to the end region on the rear side of the wall.

* * * * *